US012726100B2

(12) United States Patent
Wang

(10) Patent No.: US 12,726,100 B2
(45) Date of Patent: Sep. 1, 2026

(54) HYBRID MODE CONTROL METHOD

(71) Applicant: DELTA ELECTRONICS, INC., Taoyuan City (TW)

(72) Inventor: Ching Wang, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 704 days.

(21) Appl. No.: 18/316,453

(22) Filed: May 12, 2023

(65) Prior Publication Data

US 2024/0195281 A1 Jun. 13, 2024

(30) Foreign Application Priority Data

Dec. 8, 2022 (CN) ......................... 202211570026.0

(51) Int. Cl.
*H02M 1/00* (2007.01)
*H02J 7/90* (2026.01)
(Continued)

(52) U.S. Cl.
CPC ............. *H02M 1/0035* (2021.05); *H02J 7/90* (2026.01); *H02M 3/01* (2021.05);
(Continued)

(58) Field of Classification Search
CPC .. H02M 1/0035; H02M 3/33573; H02M 3/01; H02M 3/33584; H02M 3/33592; H02J 7/90; H02J 2207/20
(Continued)

(56) References Cited

U.S. PATENT DOCUMENTS

2010/0220500 A1 9/2010 Mino et al.
2014/0104890 A1 4/2014 Matsubara et al.
(Continued)

FOREIGN PATENT DOCUMENTS

CN 112117908 A 12/2020
JP 2011101497 A 5/2011
(Continued)

OTHER PUBLICATIONS

Senwen Luo et al: "Research on Hybrid Modulation Strategy of Bidirectional LLC Resonant Converter in Distributed Energy Storage System", 2022 IEEE 3rd China International Youth Conference On Electrical Engineering (CIYCEE), IEEE, Nov. 3, 2022, pp. 1-6; Fig. 1.

(Continued)

*Primary Examiner* — Michael R. Fin
(74) *Attorney, Agent, or Firm* — MUNCY, GEISSLER, OLDS & LOWE, P.C.

(57) ABSTRACT

A hybrid mode control method includes steps of: controlling an LLC resonant converter to operate in a burst mode when the LLC resonant converter is in a light load. Afterward, controlling the LLC resonant converter operating in a PWM mode as a load of the LLC resonant converter increases or an output voltage increases in a charging control, or controlling the LLC resonant converter operating in a PFM mode as the load increases or the input voltage decreases in a discharging control. Afterward, controlling the LLC resonant converter to operate in the PFM mode as the load of the LLC resonant converter further increases or the output voltage further increases in the charging control, or controlling the LLC resonant converter operating in a PSM mode as the load further increases or the input voltage further decreases in the discharging control.

17 Claims, 9 Drawing Sheets

(51) Int. Cl.
*H02M 3/00* (2006.01)
*H02M 3/335* (2006.01)

(52) U.S. Cl.
CPC ... *H02M 3/33573* (2021.05); *H02M 3/33584* (2013.01); *H02J 2207/20* (2020.01); *H02M 3/33592* (2013.01)

(58) Field of Classification Search
USPC .......................................................... 320/128
See application file for complete search history.

(56) References Cited

U.S. PATENT DOCUMENTS

| | | | | |
|---|---|---|---|---|
| 2016/0294294 | A1 * | 10/2016 | Ye ..................... | H02M 3/33592 |
| 2022/0286056 | A1 * | 9/2022 | Chiu ................. | H02M 3/33573 |

FOREIGN PATENT DOCUMENTS

| | | | |
|---|---|---|---|
| JP | 2014079145 | A | 5/2014 |
| TW | I752891 | B | 1/2022 |

OTHER PUBLICATIONS

Search Report dated Oct. 19, 2023 of the corresponding European patent application No. 23172844.5.

Office Action dated Dec. 17, 2024 of the corresponding Japan patent application No. 2023-190029, 3 pages.

* cited by examiner

HYBRID MODE CONTROL METHOD

BACKGROUND

Technical Field

The present disclosure relates to a hybrid mode control method, and more particularly to a hybrid mode control method applied to LLC wide-range voltage operation.

Description of Related Art

The statements in this section merely provide background information related to the present disclosure and do not necessarily constitute prior art.

With the rise of awareness of environmental protection and green energy, the sales volume of electric vehicles has doubled and the demand for charging stations has increased. The LLC resonant converter is often used in charger applications for the electric vehicles, and the LLC resonant converter shown in FIG. 1 is an example. For the forward charging (that is, the external power supply charges the battery of the electric vehicle), the input side is the VBUS side (the input voltage is VBUS), and the output side is the HVDC side (the output voltage is HVbattery). Since the voltage of the battery is very different when the battery is fully charged and when the battery is low, the range of the battery voltage (i.e., the output voltage) varies widely. For the reverse discharging (that is, the battery of the electric vehicle is discharged to the outside), the input side is the HVDC side (the input voltage is HVbattery), and the output side is the VBUS side (the output voltage is VBUS), and the range of the input voltage varies widely.

There are two main problems encountered in hardware designs of the current LLC resonant converter:

1. The range of the burst mode is too large. As shown in FIG. 1, since the range of the battery voltage as the input voltage (discharging mode, namely DCHG mode) or output voltage (charging mode, namely CHG mode) is too wide, it will lead to the design of the interval size of the burst mode will be too large.

2. In the discharging mode (DCHG), the voltage required by the inverter cannot be supplied. Under the reverse discharging operation, the voltage provided to the VBUS side is as high as 400 volts. In order to be compatible with the bidirectional operation at the same time, the voltage required by the inverter cannot be supplied. The inverter is the power factor corrector (AC to DC converter) coupled to the VBUS side in the charging operation, and it is the inverter (DC to AC converter) in the discharging operation.

In the charging mode, the current control method will change from the PFM mode to the burst mode since the voltage gain is still too high when the HVDC side is at low voltage, thereby causing the output voltage ripple to be too large (the duty cycle is fixed at 50%). However, depending on the design of the hardware resonant tank, when the HVDC side is at low voltage, a larger current will be required to leave the burst mode and return to the PFM mode. For example, it usually takes 220 volts, 8 amps to level the burst mode and return to the PFM mode.

For the insufficient voltage on the HVDC side in the discharging mode, according to the proposed delay time control, the voltage gain may be increased by shifting the switching signal on the output side to make the transformer to be short-circuit so that the resonant energy is forced to increase, thereby increasing the voltage gain. However, the phase shift of the current delay control method is based on the relationship between the output voltage and the input voltage, which is first established in a look-up table. Since this is an open-loop table lookup method, it is necessary to carefully confirm each input and output condition before it can be designed, which increases the complexity of the software and the uncertainty of many conditions.

SUMMARY

An objective of the present disclosure is to provide a hybrid mode control method to solve the problems of existing technology.

In order to achieve the above-mentioned objective, the hybrid mode control method is used for a charging control or a discharging control of an LLC resonant converter. The method includes steps of: controlling the LLC resonant converter to operate in a burst mode when determining that an output of the LLC resonant converter is in a light load; controlling the LLC resonant converter to operate in a PWM mode as a load of the LLC resonant converter increases or an output voltage of the LLC resonant converter increases in the charging control; or controlling the LLC resonant converter to operate in a PFM mode as the load of the LLC resonant converter increases or an input voltage of the LLC resonant converter decreases in the discharging control; and controlling the LLC resonant converter to operate in the PFM mode as the load of the LLC resonant converter further increases or the output voltage of the LLC resonant converter further increases in the charging control; or controlling the LLC resonant converter to operate in a PSM mode as the load of the LLC resonant converter further increases or the input voltage of the LLC resonant converter further decreases in the discharging control.

In one embodiment, the method further includes a step of: controlling the LLC resonant converter to operate in the PSM mode as the load of the LLC resonant converter further increases under the PFM mode or the output voltage of the LLC resonant converter further increases under the PFM mode in the charging control.

In one embodiment, an input side of the LLC resonant converter is a DC bus side for providing the input voltage; an output side of the LLC resonant converter is a battery load side for providing the output voltage, and the output voltage is a wide-range voltage. When the output voltage is less than the input voltage, the LLC resonant converter operates in a step-down charging control. When the output voltage is greater than the input voltage, the LLC resonant converter operates in a step-up charging control.

In one embodiment, the LLC resonant converter is controlled to operate in the burst mode with a fixed duty cycle and a fixed frequency.

In one embodiment, the LLC resonant converter is controlled to operate in the PWM mode with a variable duty cycle and a fixed frequency in the charging control. The duty cycle when operating in the PWM mode is greater than the duty cycle when operating in the burst mode.

In one embodiment, the LLC resonant converter is controlled to operate in the PFM mode with a fixed duty cycle and a variable frequency in the charging control. The frequency when operating in the PFM mode is less than the frequency when operating in the PWM mode.

In one embodiment, the LLC resonant converter is controlled to operate in the PSM mode with a fixed duty cycle, a fixed frequency, and a variable phase shift in the charging control. The frequency when operating in the PSM mode is less than the frequency when operating in the PFM mode.

In one embodiment, the duty cycle is fixed at a minimum duty cycle and the frequency is fixed at a maximum frequency when operating in the burst mode.

In one embodiment, the duty cycle varies between 50% and a minimum duty cycle and the frequency is fixed at a maximum frequency when operating in the PWM mode.

In one embodiment, the duty cycle is fixed at 50% and the frequency varies between a maximum frequency and a minimum frequency when operating in the PFM mode.

In one embodiment, the duty cycle is fixed at 50%, the frequency is fixed at a minimum frequency, and the phase shift varies between 0% and a maximum shift when operating in the PSM mode.

In one embodiment, the method further includes a step of: controlling the LLC resonant converter to operate in a PWM mode as the load of the LLC resonant converter further increases under the burst mode or the input voltage of the LLC resonant converter further decreases under the burst mode in the discharging control.

In one embodiment, an input side of the LLC resonant converter is a battery load side for providing the input voltage, and the input voltage is a wide-range voltage; an output side of the LLC resonant converter is a DC bus side for providing the output voltage. When the input voltage is greater than the output voltage, the LLC resonant converter operates in a step-down discharging control. When the input voltage is less than the output voltage, the LLC resonant converter operates in a step-up discharging control.

In one embodiment, the LLC resonant converter is controlled to operate in the PFM mode with a fixed duty cycle and a variable frequency in the discharging control. The duty cycle when operating in the PFM mode is greater than the duty cycle when operating in the burst mode, and the frequency when operating in the PFM mode is less than the frequency when operating in the burst mode.

In one embodiment, the LLC resonant converter is controlled to operate in the PSM mode with a fixed duty cycle, a fixed frequency, and a variable phase shift in the discharging control. The frequency when operating in the PSM mode is less than the frequency when operating in the PFM mode.

In one embodiment, the LLC resonant converter is controlled to operate in the PWM mode with a variable duty cycle and a fixed frequency in the discharging control. The duty cycle when operating in the PWM mode is greater than the duty cycle when operating in the burst mode.

In one embodiment, the duty cycle is fixed at 50% and the frequency varies between a maximum frequency and a minimum frequency when operating in the PFM mode.

In one embodiment, the duty cycle is fixed at 50%, the frequency is fixed at a minimum frequency, and the phase shift varies between 0% and a maximum shift when operating in the PSM mode.

In one embodiment, the duty cycle varies between 50% and a minimum duty cycle and the frequency is fixed at a maximum frequency when operating in the PWM mode.

Accordingly, the hybrid mode control method of the present disclosure has the following features and advantages: 1. Under the applications of wide-range input voltage or output voltage, the interval size of the burst mode can be appropriately designed; 2. In the discharging operation, the voltage required by the inverter can be stably supplied; 3. In the charging operation, under light load and low output voltage conditions, the resonant converter is controlled to operate in the PWM mode or the burst mode so as to reduce the output voltage ripple; 4. In the discharging operation, under heavy load and low input voltage conditions, the resonant converter is controlled to operate in the PSM mode so as to increase the voltage gain to stably maintain the output voltage.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
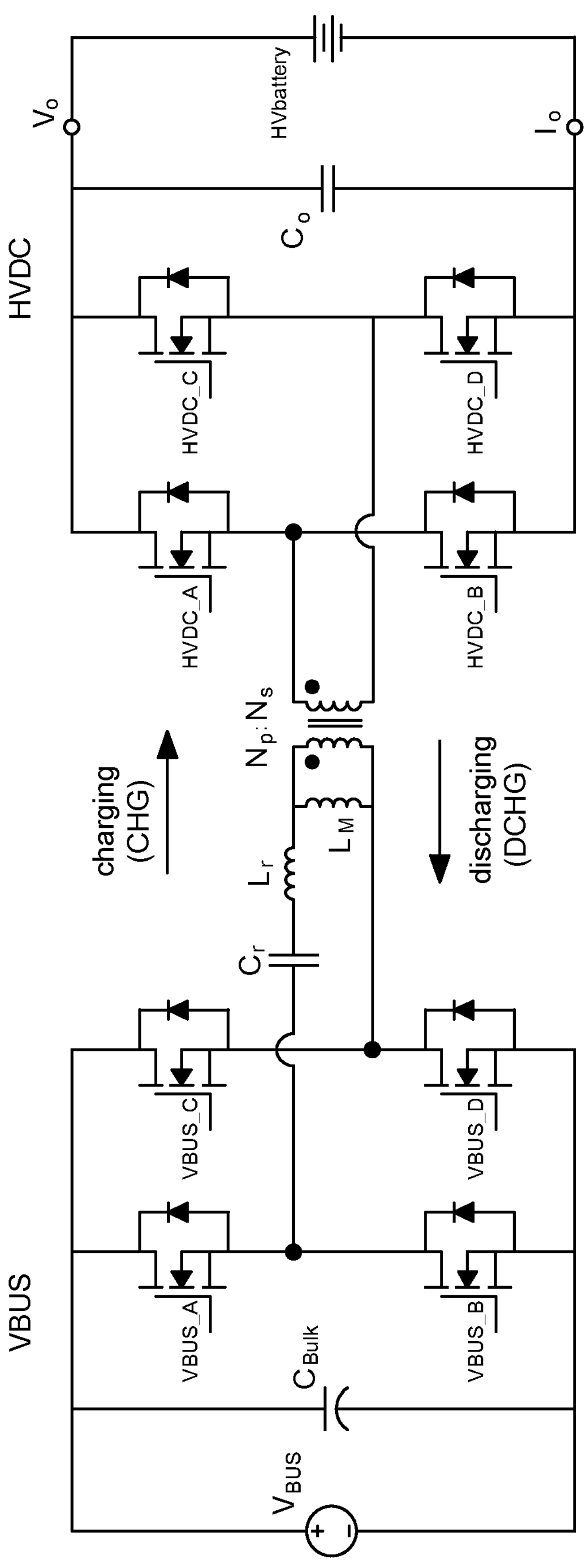
FIG. 1 is a circuit structure of an LLC resonant converter according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a circuit structure of an LLC resonant converter according to the present disclosure. In the present disclosure, the circuit structure is operating in an application of bi-directional vehicle charger. The load on the secondary side of this circuit structure is usually a battery, and active switches are provided on both the primary side and the secondary side, for example, the primary side provides active switches VBUS_A to VBUS_D, and the secondary side provides active switches HVDC_A to HVDC_D.

According to the requirements of the occasion, it is decided to use forward charging (hereinafter referred to as charging or charging operation or charging mode (CHG mode)) or reverse discharging (hereinafter referred to as discharging or discharging operation or discharging mode (DCHG mode)).

For the charging operation, the input side is the VBUS side, and its voltage fluctuation rate is generally low (it may be regarded as a fixed input voltage VBUS). If it is a single-phase system, the input voltage may be, for example but not limited to, 400 volts. Also, the output side is the HVDC side, and it is usually a battery. The voltage of the battery varies in a wide range due to different usage conditions, such as but not limited to 220 to 430 volts. Therefore, for the charging operation, when the output voltage is lower than the input voltage (for example, the input voltage is 400 volts and the output voltage is 220 volts), the LLC resonant converter charges the battery in a step-down manner; when the output voltage is greater than the input voltage (for example, the input voltage is 400 volts and the output voltage is 430 volts), the LLC resonant converter charges the battery in a step-up manner.

For the discharging operation (the direction of its power flow is opposite to that of the charging operation), the input side is the HVDC side, and the output side is the VBUS side. In this condition, the output voltage will be fixed at 400 volts, and the input voltage will vary widely, such as but not limited to 220 to 430 volts. Therefore, for the discharging operation, when the input voltage is lower than the output voltage (for example, the input voltage is 220 volts and the output voltage is 400 volts), the LLC resonant converter charges the battery in a step-up manner; when the input voltage is greater than the output voltage (for example, the input voltage is 430 volts and the output voltage is 400 volts), the LLC resonant converter charges the battery in a step-down manner.

In the charging mode (CHG mode), the controller acquires the voltage Vo and current Io at the battery side, and selects the smaller control value from two control loops (including a voltage control loop and a current control loop) to calculate. After calculation, PWM signals are outputted to control primary-side switches (VBUS_A to VBUS_D) and secondary-side switches (HVDC_A to HVDC_D). In the discharging mode (DCHG mode), since only VBUS needs to be controlled, it is a single control loop (i.e., the voltage control loop). Incidentally, the primary side and the secondary side mentioned have different definitions according to different power flows in the charging mode and the discharging mode. In other words, for the charging mode, the VBUS side is the primary side, and the HVDC side is the secondary side; conversely, for the discharging mode, the HVDC side is the primary side, and the VBUS side is the secondary side.

Figure 2:
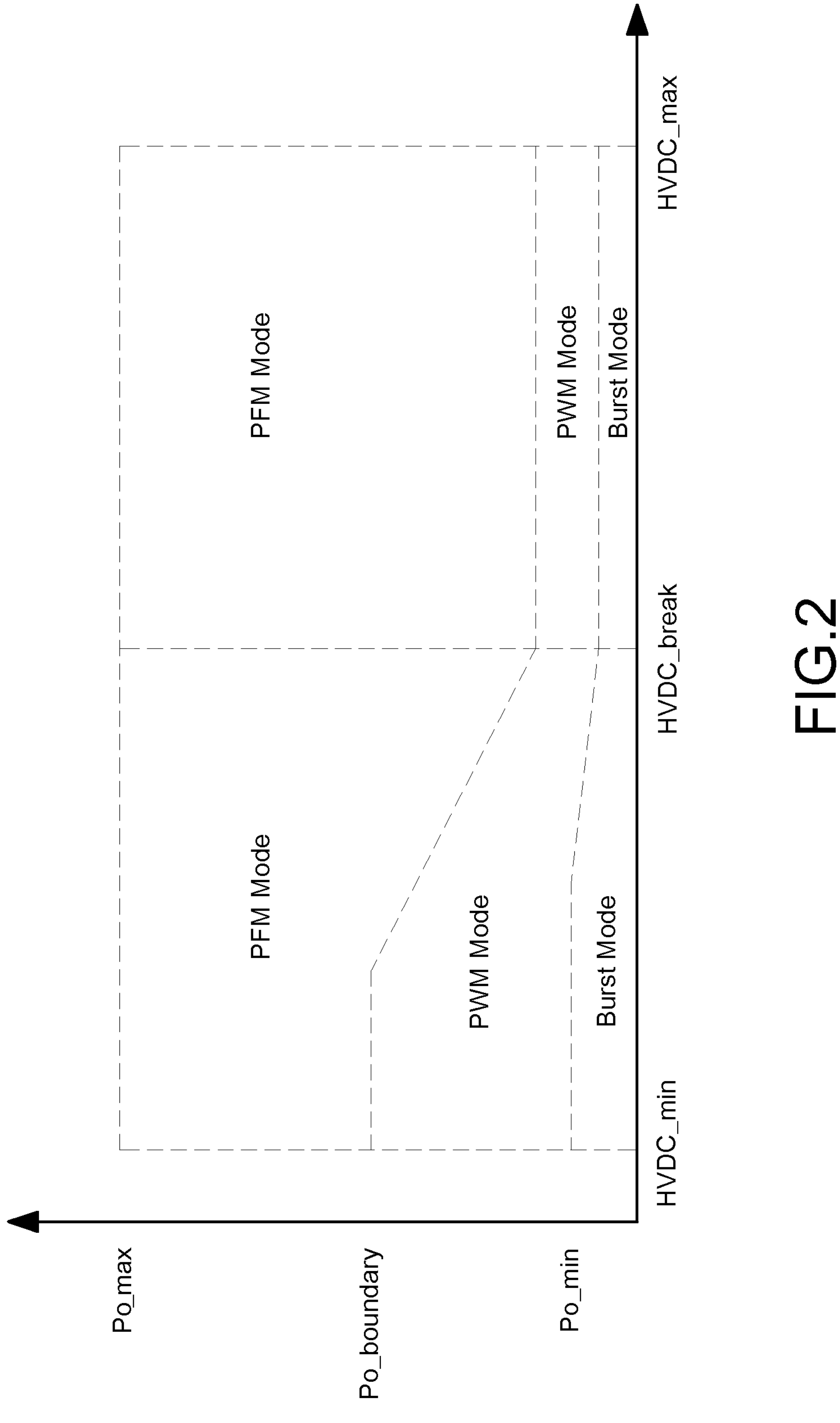
FIG. 2 is a schematic diagram of a first operation mode under a charging operation according to the present disclosure.

Please refer to FIG. 2, which shows a schematic diagram of a first operation mode under a charging operation according to the present disclosure. FIG. 2 shows the method of integrating the PWM mode (pulse-width modulation mode), the PFM mode (pulse-frequency modulation mode), and the burst mode. As mentioned above, in the charging operation, the LLC resonant converter charges the battery in a step-down (buck) conversion mode (when the input voltage is greater than the battery voltage); or the LLC resonant converter charges the battery in a step-up (boost) conversion mode (when the battery is gradually fully charged and the battery voltage gradually increases so that the input voltage is lower than the battery voltage).

Therefore, during the charging operation, when the LLC resonant converter operates at a fixed maximum frequency, the duty cycle is adjusted. For example, the LLC resonant converter operates at the PWM mode by adjusting the duty cycle between the maximum duty cycle (50%) and minimum duty cycle. The purpose of adding the PWM mode between the PFM mode and the burst mode is that under the applications of wide-range input voltage or output voltage, although the maximum duty cycle of 50% is fixed/maintained (in the PFM mode) and the maximum frequency is fixed/maintained (in the burst mode), it will still cause ripples in the output voltage. Therefore, by introducing/adding the PWM mode, the duty cycle is no longer fixed to the maximum duty cycle of 50%, but the burst mode is used at the minimum duty cycle of less than 50% (for example, 10%) so that the ripple of the output voltage can be smaller in the burst mode, and even under lighter load, the effect of reducing the ripple of the output voltage can also be achieved.

Specifically, as shown in FIG. 2, the abscissa represents the output voltage (HVDC side voltage), and the ordinate represents the output power (i.e., corresponding to the output current). For example, when the output voltage is close to the minimum voltage (HVDC_min, for example, 220 volts), the resonant converter usually operates in the burst mode when the output current is smaller and the output power is smaller (below Po_min). As the output power increases, it will leave the burst mode and enter the PWM mode. Once the output power increases to exceed a boundary power (Po_boundary), it will leave the PWM mode and enter PFM mode.

Furthermore, when the output voltage increases, for example, when the output voltage is a break voltage (HVDC_break, for example, 300 volts), the output power required for the resonant converter to leave the burst mode and enter the PWM mode does not need to be too large. In other words, it does not require too much output power to make the resonant converter leave the burst mode and enter the PWM mode. Since the range of the PWM mode is relatively small, only a little more output power is needed to leave the PWM mode and enter the PFM mode. Similarly, when the output voltage further increases, it is easier for the resonant converter to leave the burst mode and enter the PWM mode, and it is easier to leave the PWM mode and enter the PFM mode so that the resonant converter enters the normal operation mode.

In other words, in order to cope with a wide range of the output voltage and achieve the purpose of reducing the output voltage ripple under light load or even very light load operation, the PWM mode is introduced to achieve the effect of voltage ripple reduction cannot be solved by only entering the burst mode in the PFM mode, especially in the very light load operation.

Accordingly, by integrating the PFM mode, the PWM mode, and the burst mode, it can solve the situation that the voltage gain is still too high under the condition of low voltage output or high voltage input so that the output voltage will not fluctuate too much due to entering the burst mode, and a more stable output effect can be achieved.

Figure 3:
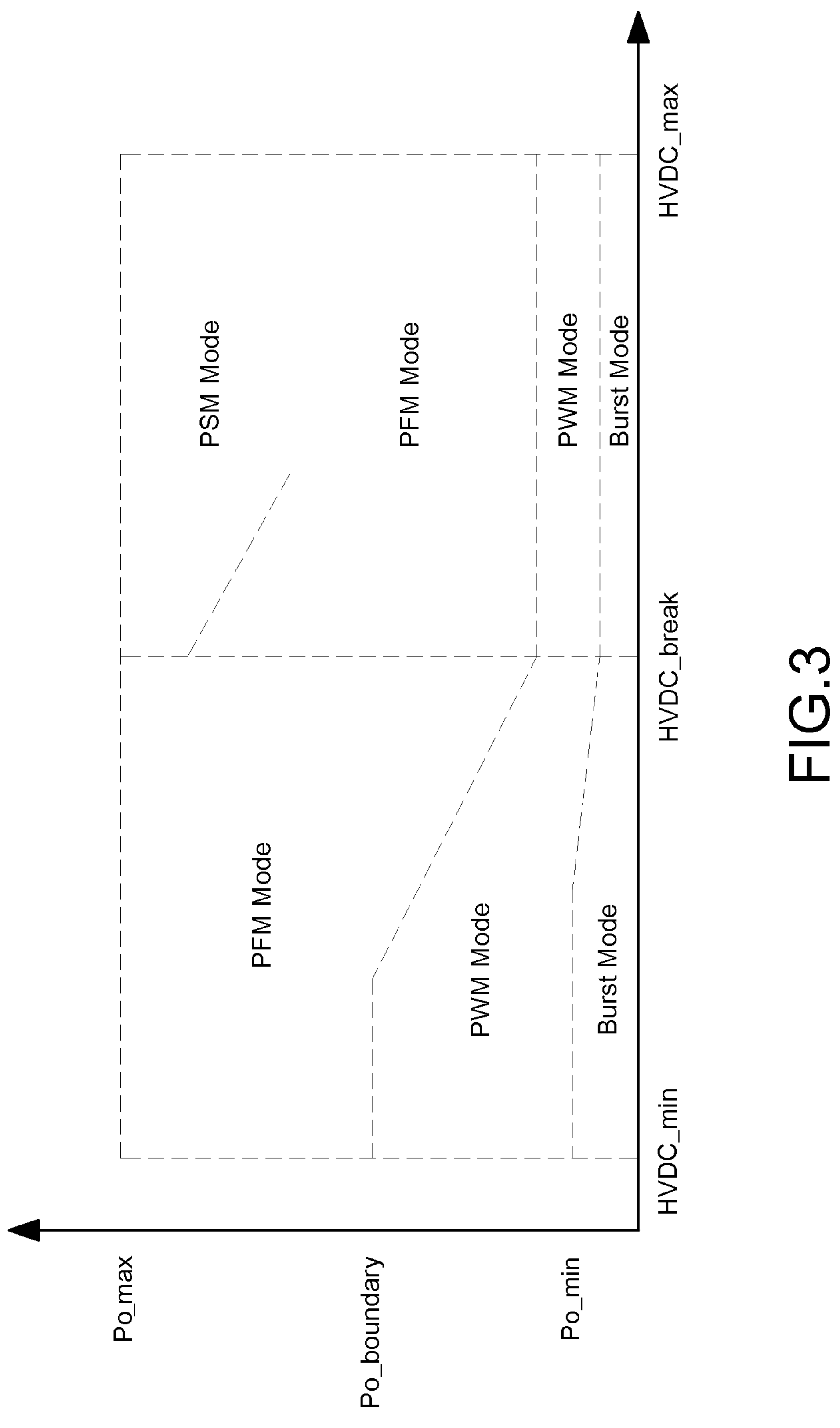
FIG. 3 is a schematic diagram of a second operation mode under the charging operation according to the present disclosure.

Please refer to FIG. 3, which is a schematic diagram of a second operation mode under the charging operation according to the present disclosure. Compared to the first operation mode shown in FIG. 2, a PSM mode (phase-shift modulation mode) is added. In the charging operation, the secondary side is the synchronous rectification side. In the PFM mode and the PWM mode, it can be decided whether to enable the synchronous rectification function according to the requirement of efficiency. Furthermore, the original open-loop injection phase shifting method may be changed to a closed-loop control method so that the phase shift on the synchronous rectification side with a fixed frequency and duty cycle is preformed to increase the voltage conversion ratio when the frequency gradually decreases to the lowest frequency due to insufficient voltage gain. Therefore, it only needs to determine the lowest frequency and limit the maximum phase shift to achieve the convenience of adjusting parameters. Accordingly, through the phase-shift modulation mode control of delay control under the closed loop and low frequency, it can solve the problem that cannot be achieved by only PFM mode operation only higher voltage gain is required at higher output voltage or heavier loading.

Figure 6:
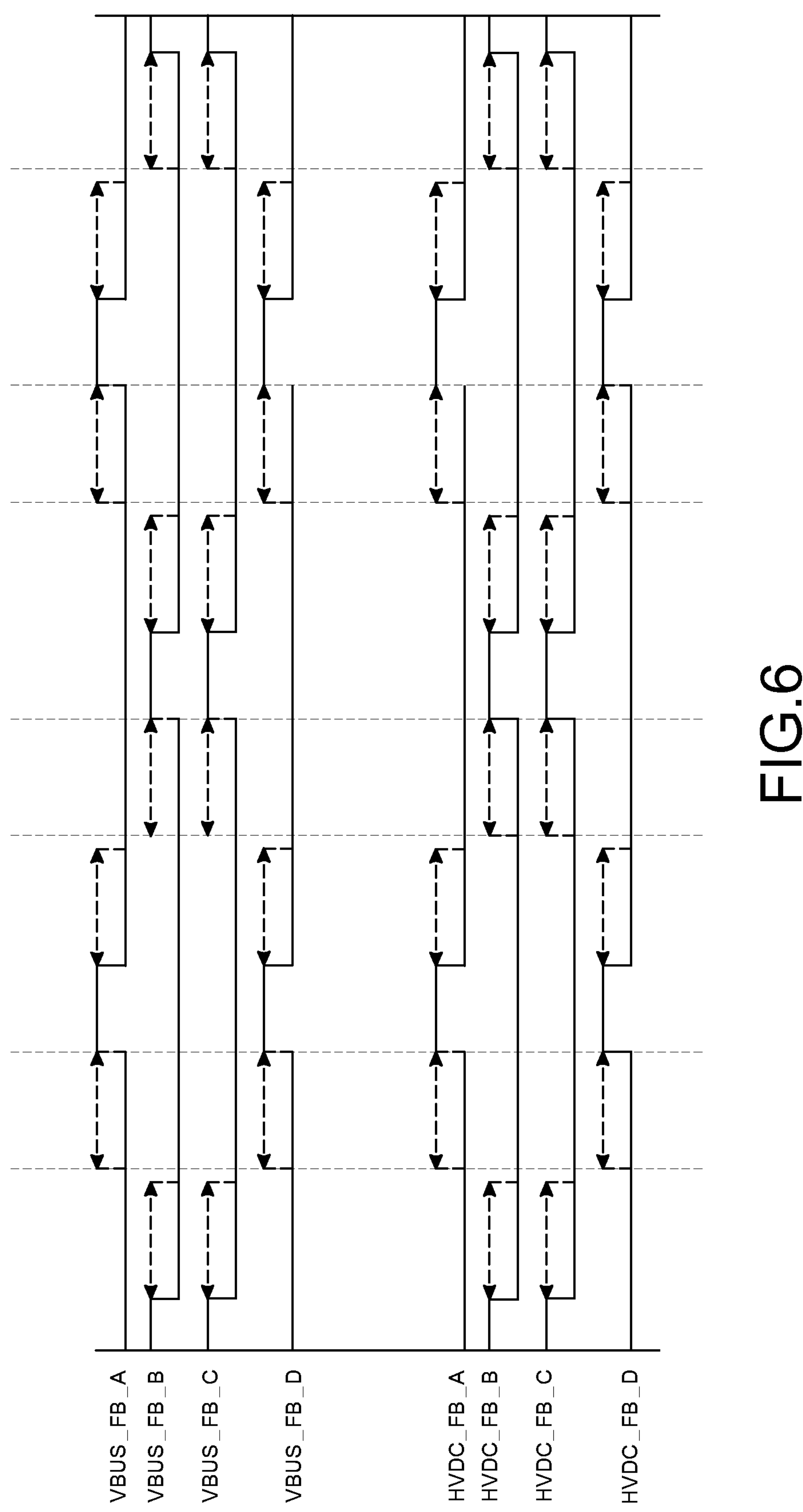
FIG. 6 is a schematic diagram of control signals of active switches at a primary side and a secondary side under the charging operation according to the present disclosure.

Please refer to FIG. 6, which shows a schematic diagram of control signals of active switches at a primary side and a secondary side under the charging operation according to the present disclosure. As shown in FIG. 6, the duty cycle is controlled between the minimum value (minimum duty cycle) and the maximum value (maximum duty cycle), and from the duty cycle of the minimum value shown by the solid lines, it can be increased to the duty cycle of the maximum value shown by the dotted lines. For example, according to the load increase, the duty cycle may be increased from the minimum value to the maximum value, and then even enter the PFM mode (i.e., the normal operation mode).

Figure 4:
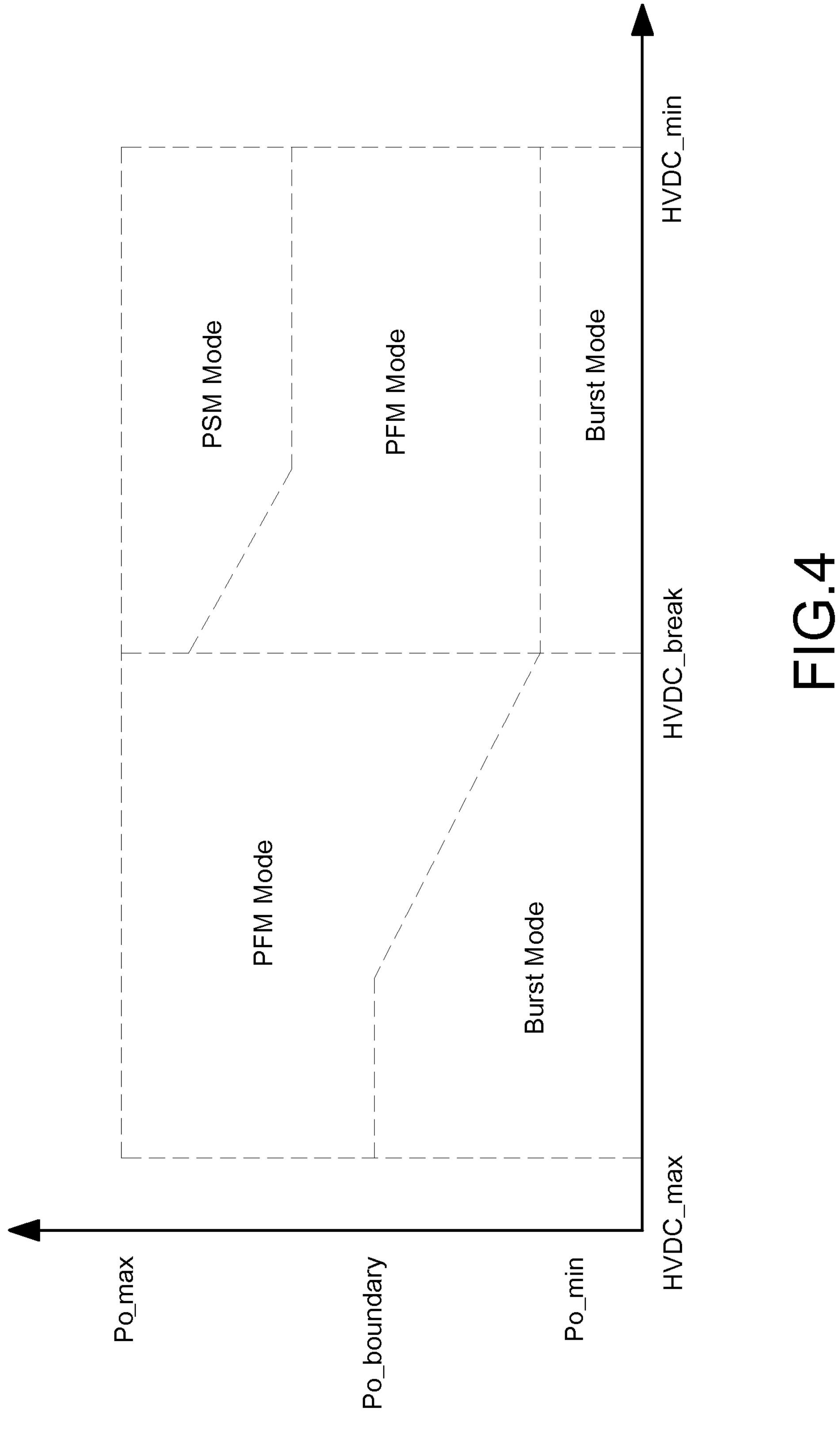
FIG. 4 is a schematic diagram of a first operation mode under a discharging operation according to the present disclosure.

Please refer to FIG. 4, which shows a schematic diagram of a first operation mode under a discharging operation according to the present disclosure. When the resonant converter operates under the normal operation, that is, the PFM mode, and the frequency gradually decreases to reach the lowest (minimum) limit frequency, the delay time control is started so that the control of the resonant converter is in the PSM mode. In this mode, the purpose of delay control is implemented through the phase shift of the switching signal to stabilize (regulate) the output voltage.

Specifically, in the discharging operation, when the load becomes heavier, the input voltage is insufficient, and the stable output voltage cannot be provided, the delay time may be controlled by shifting the switching signal on the secondary side (that is, the VBUS side) to make the transformer to be short-circuit so that the resonant energy is forced to increase, thereby increasing the voltage gain and maintaining stability of the output voltage.

Figure 5:
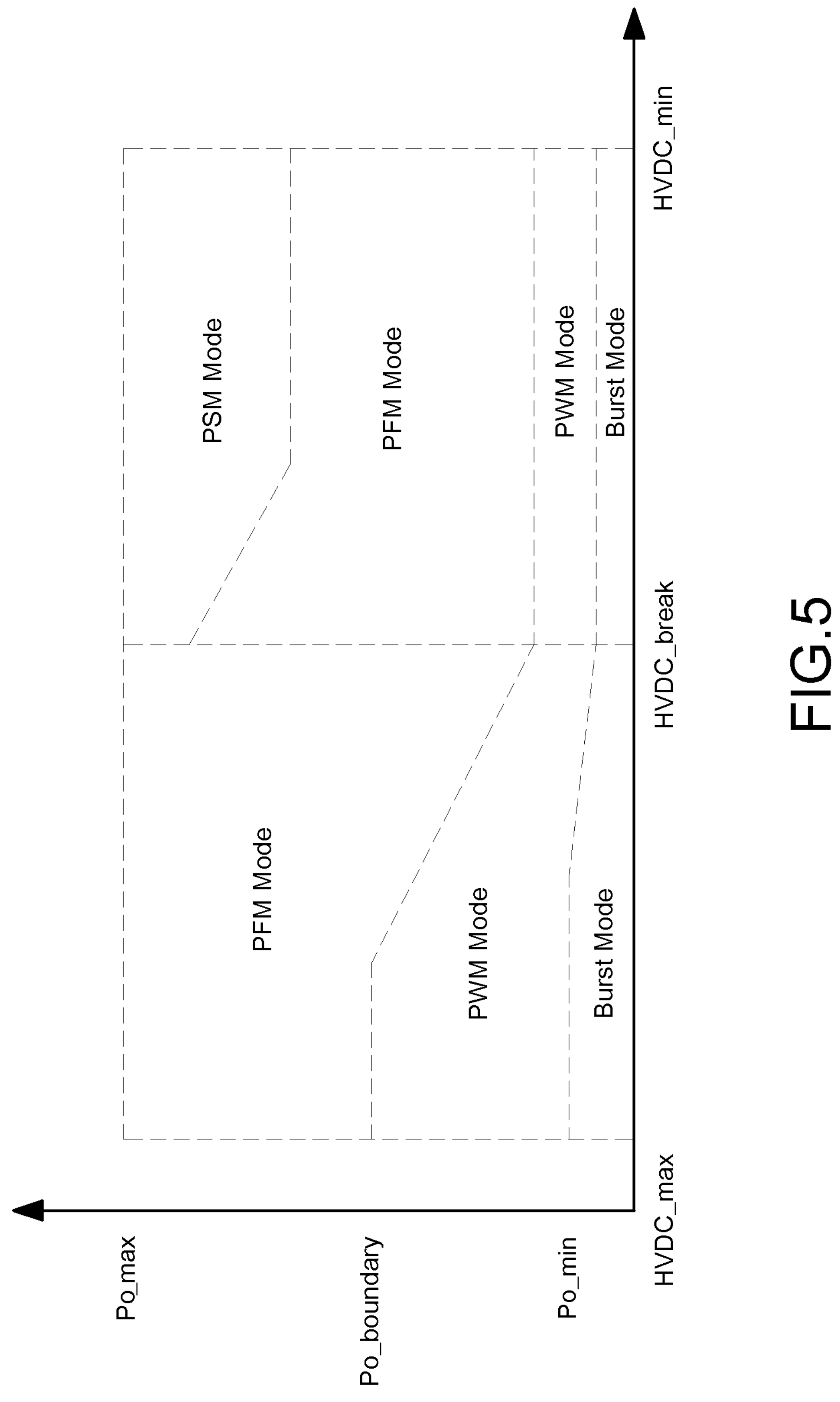
FIG. 5 is a schematic diagram of a second operation mode under the discharging operation according to the present disclosure.

Please refer to FIG. 5, which shows a schematic diagram of a second operation mode under the discharging operation according to the present disclosure. Compared to the first operation mode shown in FIG. 4, a PWM mode (phase-width modulation mode) is added between the PFM mode and the burst mode. Also, according to different conditions of the input voltage and the output voltage, the operation modes may be adjusted/switched. For example, under the light load and low input voltage, it may operate in the burst mode or the PWM mode. When the load becomes heavier or the input voltage decreases, it will be adjusted/switched to the PFM mode. Alternatively, when the load further increases or the input voltage further decreases, and the frequency is at the lowest frequency, it will be adjusted/switched to the PSM mode. Therefore, the voltage gain can be increased to control the output voltage to maintain stability.

Figure 7:
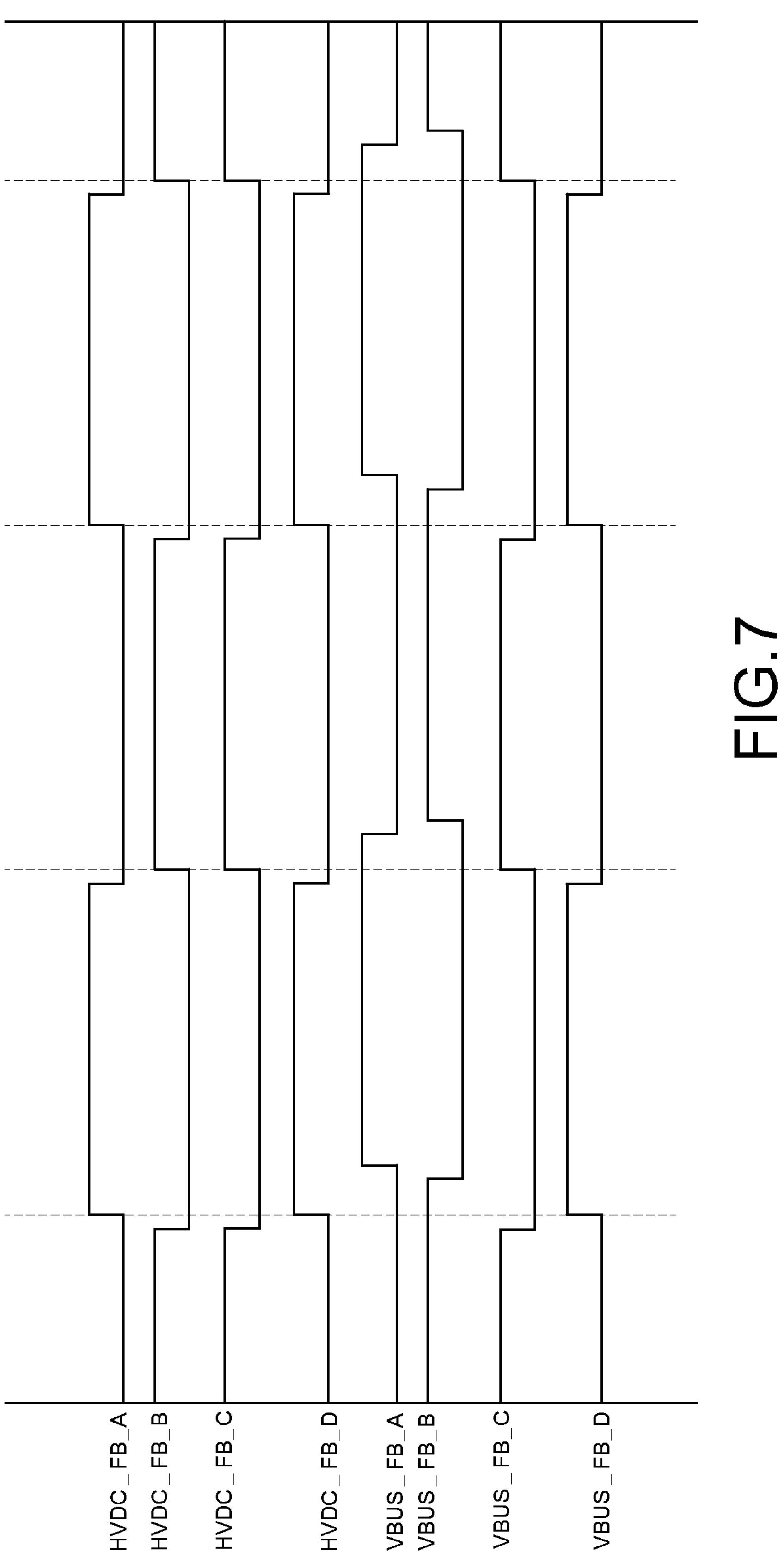
FIG. 7 is a schematic diagram of control signals of active switches at the primary side and the secondary side under the discharging operation according to the present disclosure.

Please refer to FIG. 7, which shows a schematic diagram of control signals of active switches at the primary side and the secondary side under the discharging operation according to the present disclosure. As mentioned above, when operating in the discharging mode (DCHG), the input voltage is insufficient or the output load is too large, which will make the resonant converter unable to supply the voltage required by the inverter. Therefore, the output voltage can be maintained at the voltage required by the inverter by the phase shift control. As shown in FIG. 7, under the normal synchronous rectification control, the primary-side switches (i.e., HVDC_A to HVDC_D) and the secondary-side switches (i.e., VBUS_A to VBUS_D) are controlled correspondingly. However, in the operation of the PSM mode, by shifting phases of the switches at the secondary side (i.e., the VBUS side), for example, shifting phase of the switch A (i.e., VBUS_A) to make the switch A and the switch C (i.e., VBUS_C) overlap the conduction time to achieve short-circuit of the transformer to force the increase of resonance energy. Similarly, the switch B (i.e., VBUS_B) may be phase-shifted so that the conduction time of the switch B and the switch D (i.e., VBUS_D) overlap the conduction time to achieve short-circuit of the transformer, thereby increasing the voltage gain to stably maintain the output voltage. Incidentally, the operation of the PSM mode in the charging mode is as described in this paragraph, and the phase shift is also performed on the secondary-side switches (that is, the switches HVDC_A and HVDC_B on the synchronous rectification side) to increase the voltage gain.

Figure 8:
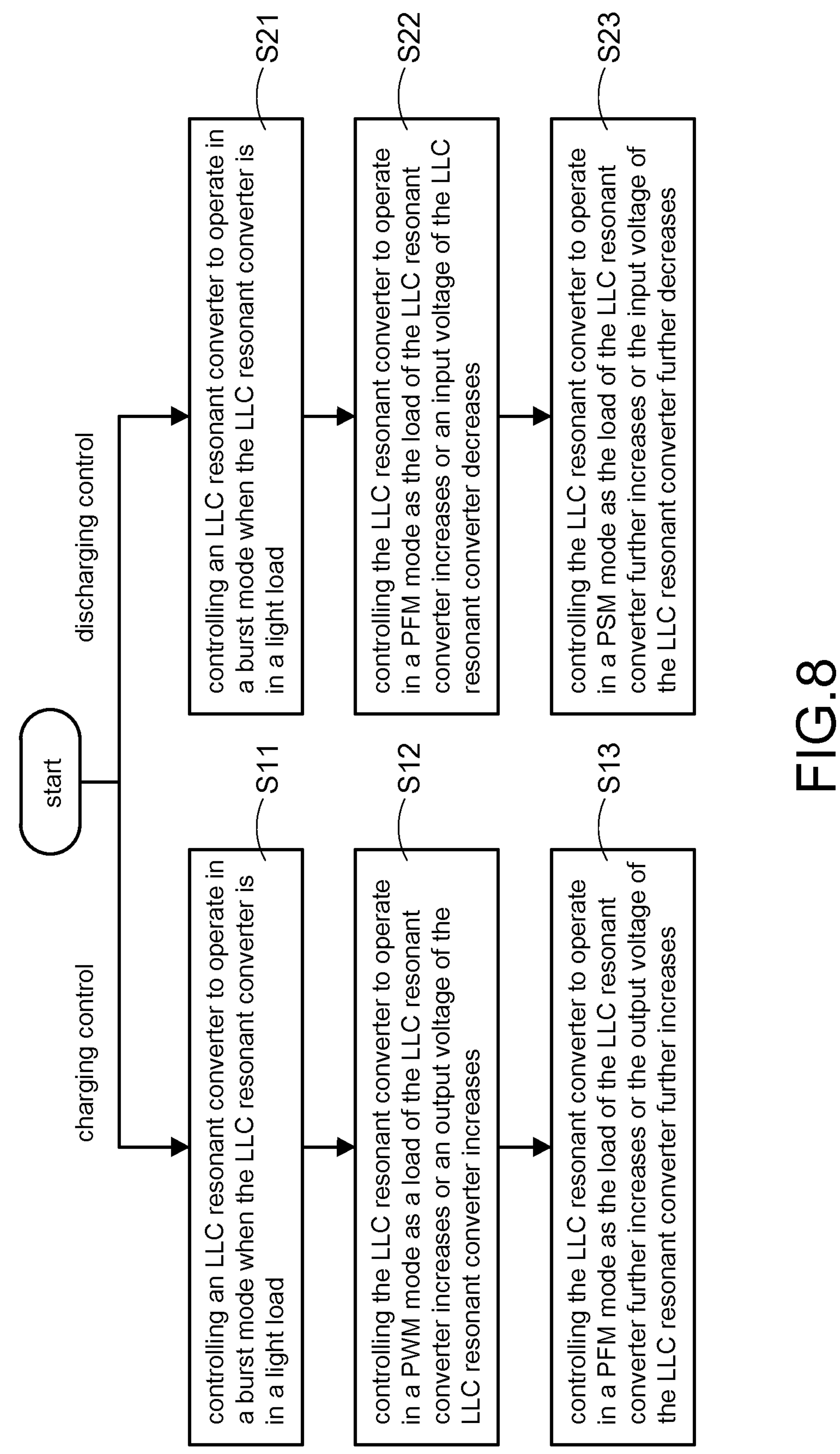
FIG. 8 is a flowchart of a hybrid mode control method under the first operation mode according to the present disclosure.

Please refer to FIG. 8, which shows a flowchart of a hybrid mode control method under the first operation mode according to the present disclosure. This hybrid mode control method is used to control the charging or discharging of the LLC resonant converter, and the method includes steps of: first, controlling the LLC resonant converter to operate in a burst mode regardless of charging control or discharging control when determining that an output of the LLC resonant converter is in a light load (S11, S21).

Afterward, controlling the LLC resonant converter to operate in a PWM mode as a load of the LLC resonant converter increases or an output voltage of the LLC resonant converter increases in the charging control (S12); or controlling the LLC resonant converter to operate in a PFM mode as the load of the LLC resonant converter increases or an input voltage of the LLC resonant converter decreases in the discharging control (S22).

Afterward, controlling the LLC resonant converter to operate in the PFM mode as the load of the LLC resonant converter further increases or the output voltage of the LLC resonant converter further increases in the charging control (S13); or controlling the LLC resonant converter to operate in a PSM mode as the load of the LLC resonant converter further increases or the input voltage of the LLC resonant converter further decreases in the discharging control (S23).

Figure 9:
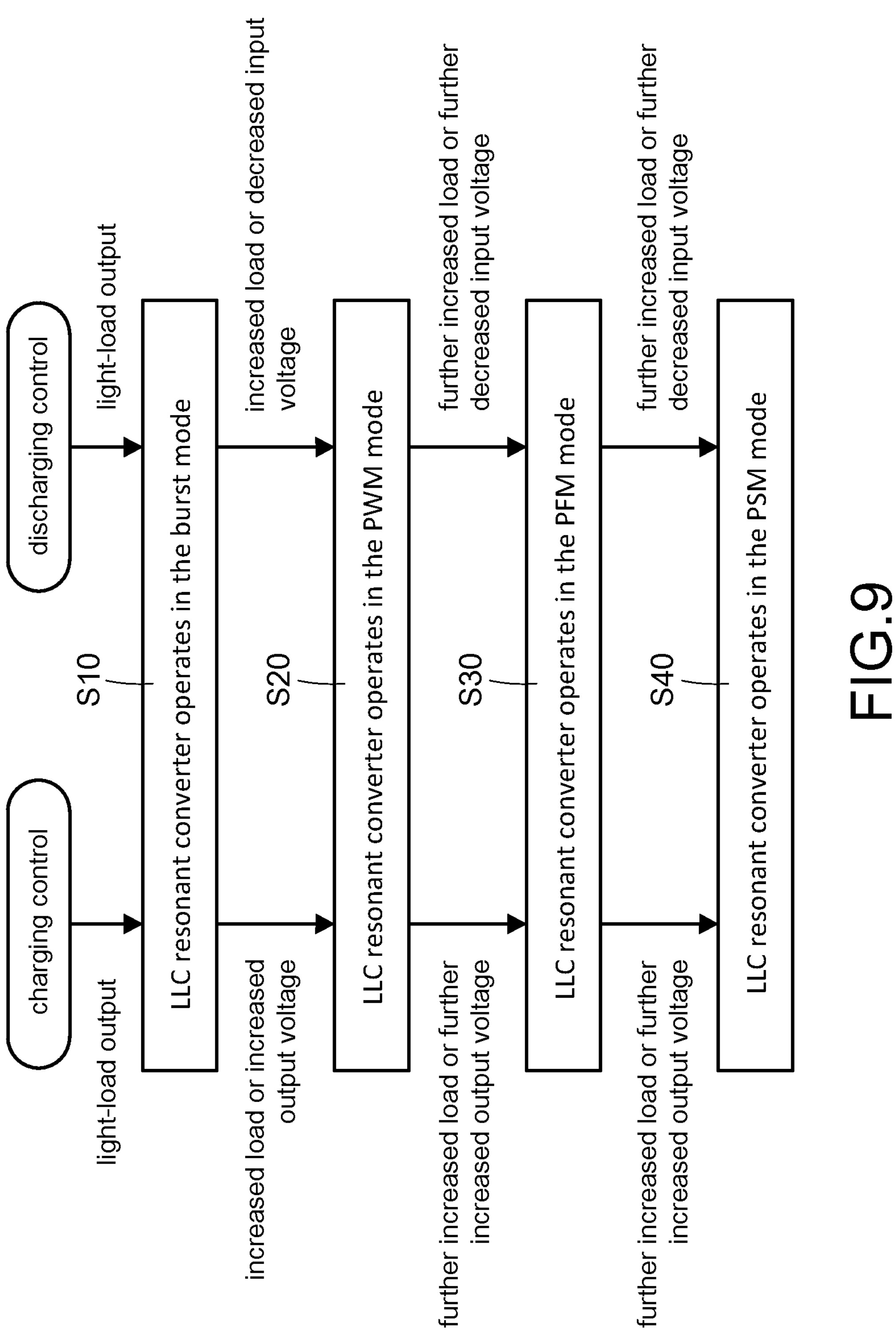
FIG. 9 is a flowchart of the hybrid mode control method under the second operation mode according to the present disclosure.

Please refer to FIG. 9, which shows a flowchart of the hybrid mode control method under the second operation mode according to the present disclosure. Specifically, in the charging control, step S10 in FIG. 9 corresponds to step S11 in FIG. 8, step S20 in FIG. 9 corresponds to step S12 in FIG. 8, and step S30 in FIG. 9 corresponds to step S13 in FIG. 8. Compared to the first operation mode shown in FIG. 8, during the PFM mode in the charging control (S13), when the load of the LLC resonant converter further increases or the output voltage further increases, the LLC resonant converter is controlled to operate in a PSM mode (S40).

Alternatively, in the discharging control, step S10 in FIG. 9 corresponds to step S21 in FIG. 8, step S30 in FIG. 9 corresponds to step S22 in FIG. 8, and step S40 in FIG. 9 corresponds to step S23 in FIG. 8. Compared to the first operation mode shown in FIG. 8, during the burst mode in the discharging control (S21), when the load of the LLC resonant converter further increases or the input voltage further decreases, the LLC resonant converter is controlled to operate in the PWM mode (S20). Therefore, as shown in FIG. 9, regardless of whether the LLC resonant converter is in the charging control or the discharging control, it can be operated in the hybrid mode, including the burst mode, the PWM (pulse-width modulation) mode, the PFM (pulse-frequency modulation) mode, and the PSM (phase-shift modulation) mode.

In summary, the present disclosure has the following features and advantages:

1. Under the applications of wide-range input voltage or output voltage, the interval size of the burst mode can be appropriately designed.

2. In the discharging operation, the voltage required by the inverter can be stably supplied.

3. In the charging operation, under light load and low output voltage conditions, the resonant converter is controlled to operate in the PWM mode or the burst mode so as to reduce the output voltage ripple.

4. In the discharging operation, under heavy load and low input voltage conditions, the resonant converter is controlled to operate in the PSM mode so as to increase the voltage gain to stably maintain the output voltage.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A hybrid mode control method, configured for a charging control or a discharging control of a battery of an LLC resonant converter, the method comprising steps of:

controlling the LLC resonant converter to operate in a burst mode when determining that an output of the LLC resonant converter is in a light load, controlling the LLC resonant converter to operate in a PWM mode as a load of the LLC resonant converter increases or an output voltage of the LLC resonant converter increases in the charging control of the battery, and further controlling the LLC resonant converter to operate in a PFM mode as the load of the LLC resonant converter further increases or the output voltage of the LLC resonant converter further increases in the discharging control of the battery;

controlling the LLC resonant converter to operate in the PFM mode from the burst mode as the load of the LLC resonant converter further increases or the output voltage of the LLC resonant converter further decreases in the discharging control of the battery, and further controlling the LLC resonant converter to operate in a PSM mode as the load of the LLC resonant converter further increases or the input voltage of the LLC resonant converter further decreases in the discharging control of the battery; and controlling the LLC resonant converter to operate in the PSM mode from the PFM mode as the load of the LLC resonant converter further increases or the output voltage of the LLC resonant converter further increases in the charging control of the battery; wherein the LLC resonant converter is controlled to operate in the PSM mode with a fixed duty cycle, a fixed frequency, and a variable phase shift in the charging control of the battery; wherein the frequency when operating in the PSM mode is less than the frequency when operating in the PFM mode.

2. The hybrid mode control method as claimed in claim 1, wherein an input side of the LLC resonant converter is a DC bus side for providing the input voltage; an output side of the LLC resonant converter is a battery load side for providing the output voltage, and the output voltage is a wide-range voltage;

wherein when the output voltage is less than the input voltage, the LLC resonant converter operates in a step-down charging control of the battery; when the output voltage is greater than the input voltage, the LLC resonant converter operates in a step-up charging control of the battery.

3. The hybrid mode control method as claimed in claim 1, wherein the LLC resonant converter is controlled to operate in the burst mode with a fixed duty cycle and a fixed frequency.

4. The hybrid mode control method as claimed in claim 1, wherein the LLC resonant converter is controlled to operate in the PWM mode with a variable duty cycle and a fixed frequency in the charging control of the battery; wherein the duty cycle when operating in the PWM mode is greater than the duty cycle when operating in the burst mode.

5. The hybrid mode control method as claimed in claim 1, wherein the LLC resonant converter is controlled to operate in the PFM mode with a fixed duty cycle and a variable frequency in the charging control of the battery; wherein the frequency when operating in the PFM mode is less than the frequency when operating in the PWM mode.

6. The hybrid mode control method as claimed in claim 3, wherein the duty cycle is fixed at a minimum duty cycle and the frequency is fixed at a maximum frequency when operating in the burst mode.

7. The hybrid mode control method as claimed in claim 4, wherein the duty cycle varies between 50% and a minimum duty cycle and the frequency is fixed at a maximum frequency when operating in the PWM mode.

8. The hybrid mode control method as claimed in claim 5, wherein the duty cycle is fixed at 50% and the frequency varies between a maximum frequency and a minimum frequency when operating in the PFM mode.

9. The hybrid mode control method as claimed in claim 7, wherein the duty cycle is fixed at 50%, the frequency is fixed at a minimum frequency, and the phase shift varies between 0% and a maximum shift when operating in the PSM mode.

10. The hybrid mode control method as claimed in claim 1, further comprising a step of:

controlling the LLC resonant converter to operate in a PWM mode from the burst mode as the load of the LLC resonant converter further increases or the input voltage of the LLC resonant converter further decreases in the discharging control of the battery.

11. The hybrid mode control method as claimed in claim 1, wherein an input side of the LLC resonant converter is a battery load side for providing the input voltage, and the input voltage is a wide-range voltage; an output side of the LLC resonant converter is a DC bus side for providing the output voltage;

wherein when the input voltage is greater than the output voltage, the LLC resonant converter operates in a step-down discharging control of the battery; when the input voltage is less than the output voltage, the LLC resonant converter operates in a step-up discharging control of the battery.

12. The hybrid mode control method as claimed in claim 1, wherein the LLC resonant converter is controlled to operate in the PFM mode with a fixed duty cycle and a variable frequency in the discharging control of the battery; wherein the duty cycle when operating in the PFM mode is greater than the duty cycle when operating in the burst mode, and the frequency when operating in the PFM mode is less than the frequency when operating in the burst mode.

13. The hybrid mode control method as claimed in claim 1, wherein the LLC resonant converter is controlled to operate in the PSM mode with a fixed duty cycle, a fixed frequency, and a variable phase shift in the discharging control of the battery; wherein the frequency when operating in the PSM mode is less than the frequency when operating in the PFM mode.

14. The hybrid mode control method as claimed in claim 10, wherein the LLC resonant converter is controlled to operate in the PWM mode with a variable duty cycle and a fixed frequency in the discharging control of the battery; wherein the duty cycle when operating in the PWM mode is greater than the duty cycle when operating in the burst mode.

15. The hybrid mode control method as claimed in claim 12, wherein the duty cycle is fixed at 50% and the frequency varies between a maximum frequency and a minimum frequency when operating in the PFM mode.

16. The hybrid mode control method as claimed in claim 13, wherein the duty cycle is fixed at 50%, the frequency is fixed at a minimum frequency, and the phase shift varies between 0% and a maximum shift when operating in the PSM mode.

17. The hybrid mode control method as claimed in claim 14, wherein the duty cycle varies between 50% and a minimum duty cycle and the frequency is fixed at a maximum frequency when operating in the PWM mode.

* * * * *